F. J. HARRISON & W. J. KNOX.
LOCOMOTIVE PILOT.
APPLICATION FILED MAR. 7, 1914.

1,135,520.

Patented Apr. 13, 1915.

3 SHEETS—SHEET 1.

Witnesses,
J. Adolph Bishop
M. P. Smith

Inventors,
Frederick J. Harrison
William J. Knox,
By F. K. Carnwall.
Atty.

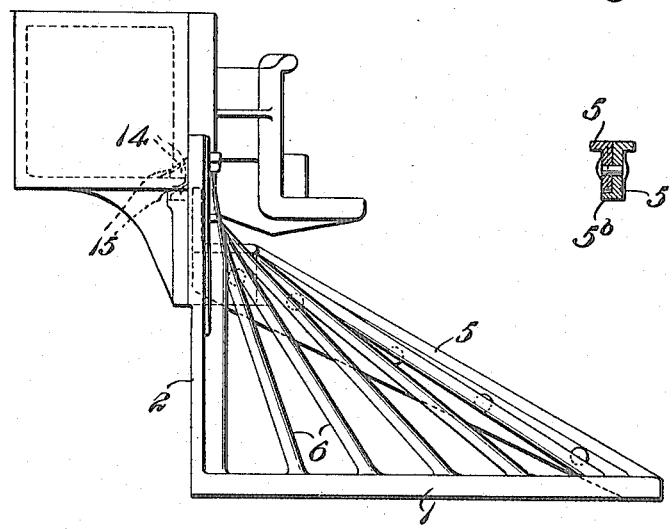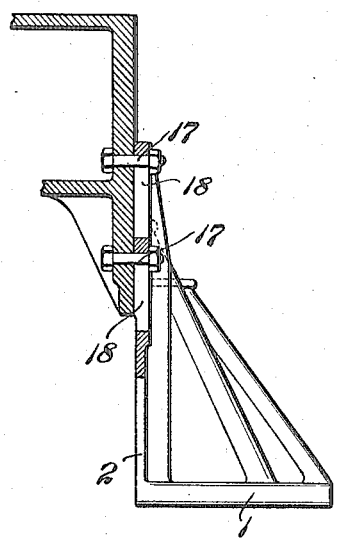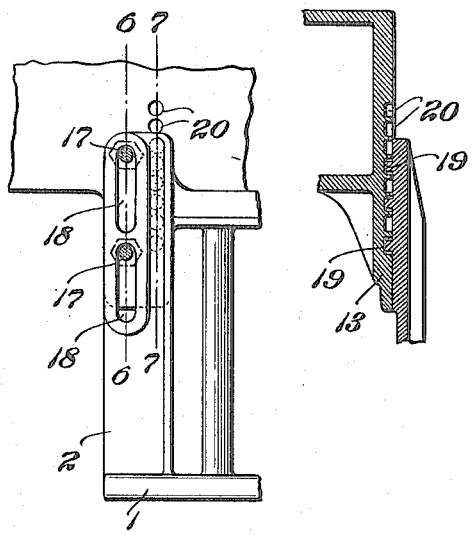

F. J. HARRISON & W. J. KNOX.
LOCOMOTIVE PILOT.
APPLICATION FILED MAR. 7, 1914.

1,135,520.

Patented Apr. 13, 1915.
3 SHEETS—SHEET 3.

Witnesses,
J. Adolph Bishop
M. Smith

Inventors,
Frederick J. Harrison,
William J. Knox,
By J. H. Cornwall.
Atty.

UNITED STATES PATENT OFFICE.

FREDERICK J. HARRISON AND WILLIAM J. KNOX, OF DUBOIS, PENNSYLVANIA, ASSIGNORS TO CAST STEEL PILOT COMPANY, A CORPORATION OF DELAWARE.

LOCOMOTIVE-PILOT.

1,135,520.  Specification of Letters Patent.  Patented Apr. 13, 1915.

Application filed March 7, 1914.  Serial No. 823,141.

*To all whom it may concern:*

Be it known that we, FREDERICK J. HARRISON and WILLIAM J. KNOX, citizens of the United States, residing at Dubois, Pennsylvania, have invented a certain new and useful Improvement in Locomotive-Pilots, of which the following is a full, clear, and exact description, such as will enable others skilled in the art to which it appertains to make and use the same, reference being had to the accompanying drawings, forming part of this specification, in which—

Figure 1:
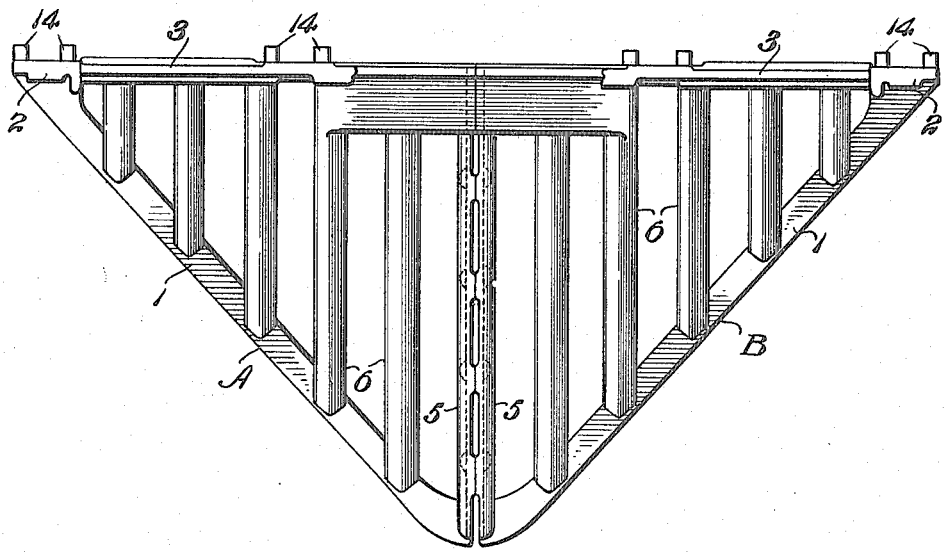
Figure 2:
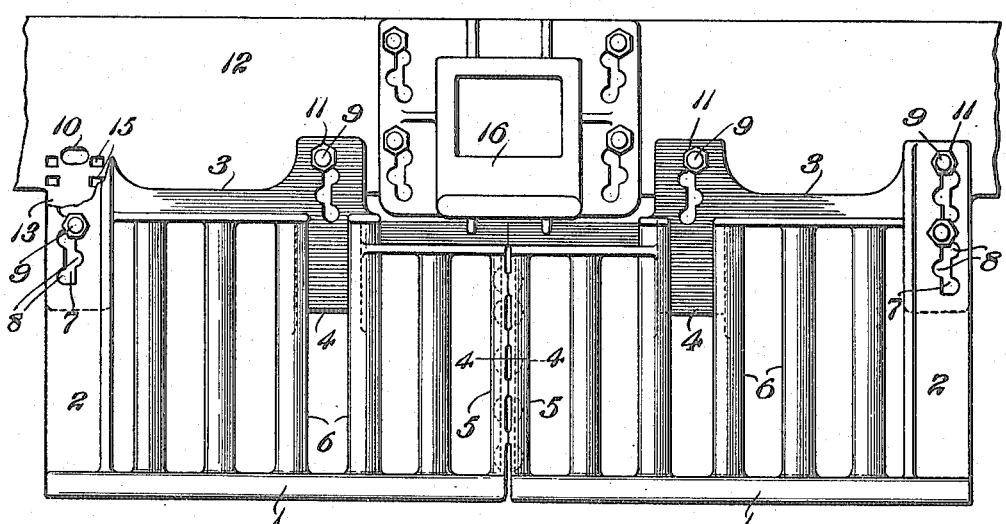
Figure 9:
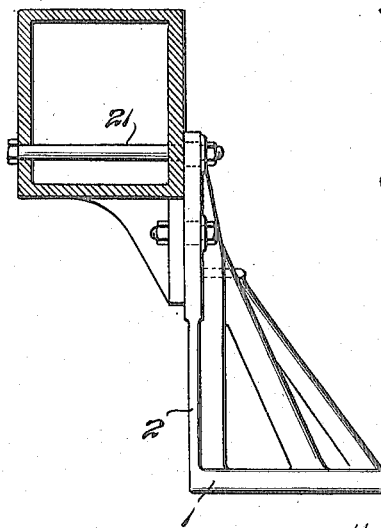
Figure 8:
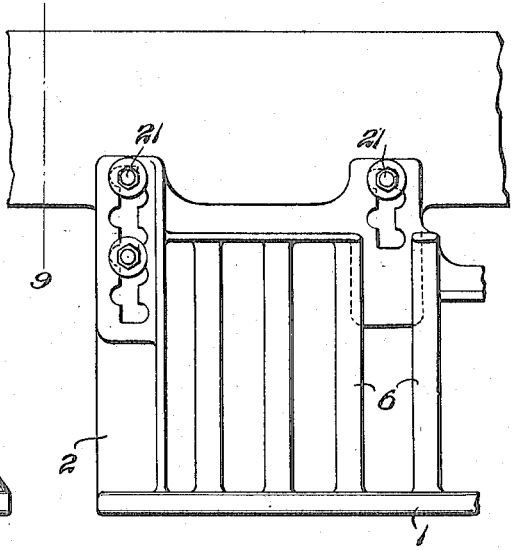
Figure 10:
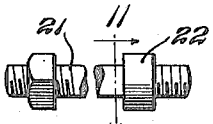
Figure 11:
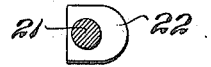
Figure 12:
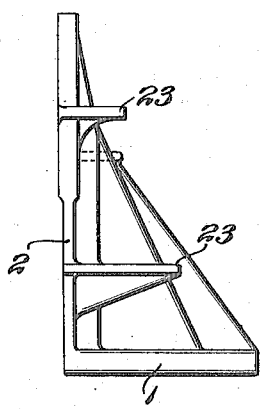
Figure 13:
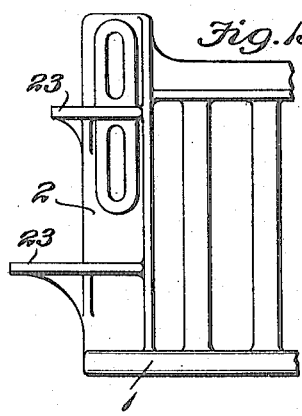

Figure 1 is a plan view of a locomotive pilot of our improved construction. Fig. 2 is a front elevational view of the pilot in position on a bumper beam and showing a coupler pocket on said beam. Fig. 3 is a side elevation of the pilot and coupler pocket applied to the bumper beam. Fig. 4 is a detail section taken approximately on the line 4—4 of Fig. 2. Fig. 5 is a front elevational view of the end portion of a pilot of our improved construction and showing a modified form of the attaching means or connection between said pilot and the bumper beam. Fig. 6 is a vertical section taken on the line 6—6 of Fig. 5. Fig. 7 is a vertical section taken on the line 7—7 of Fig. 5. Fig. 8 is a front elevational view of the end portion of a pilot and showing a further modified form of attaching means. Fig. 9 is a section taken approximately on the line 9—9 of Fig. 8, and showing the pilot in side elevation. Fig. 10 is an elevational view of a bolt used in connection with the form of attaching means shown in Figs. 8 and 9. Fig. 11 is a detail section taken approximately on the line 11—11 of Fig. 10. Fig. 12 is an end elevational view of a modified form of our improved pilot. Fig. 13 is a front elevational view of the end portion of the form of pilot seen in Fig. 12.

Our invention relates to new and useful improvements in locomotive pilots of the type shown in Patent No. 1,071,155, issued to us August 26, 1913, the principal objects of our present invention being to generally improve upon and simplify the constructions disclosed in the patent aforesaid, and to form the main body of the pilot in two, or more parts, which are preferably cast. Thus the manufacture of the pilots is greatly simplified and cheapened for the reason that two or more comparatively small castings can be produced much more readily and with considerable less expense than a single large casting, and furthermore, in the event of damage to one side of the pilot by collision, derailment or from other cause, the damaged portion may be replaced and the undamaged portion continued in service.

Further objects of our invention are; to provide simple means for rigidly attaching the pilot to the bumper beam, which attaching means permits the pilot to be readily and accurately adjusted vertically to suit different conditions; to provide simple means for relieving the pilot attaching bolts from all shearing strains due to the weight of the pilot, and further, to form integral with the end portions of the pilot, a series of projecting brackets which serve as steps to meet the requirements of certain rules and regulations of the Interstate Commerce Commission, said steps serving as means whereby trainmen can readily reach the bumper beam from the ground.

With the above and other objects in view, our invention consists in certain novel features of construction and arrangement of parts hereinafter more fully described and claimed.

The form of pilot illustrated in Figs. 1 to 4 inclusive, consists of two integral half members A and B, which are preferably cast, one right and one left, and being united at a vertical center line by rivets, bolts or by electric welding.

Each half member comprises a base 1, an upright end member or post 2, a horizontally disposed top rail 3, a vertically disposed plate 4, an inner end or half center slat 5, and a series of intermediate inclined slats 6 between the slat 5 and post 2, and extending from the base member 1 and rail 3. The base member 1 occupies a horizontal plane and is inclined or positioned at an angle with respect to the vertical plane occupied by the end rail or post 2 and top rail 3.

The half center slat $5^a$ on one of the half members of the pilot is provided along its lower edge with a laterally projecting lip or flange $5^b$ which receives and supports the half center slat of the opposite section. (See Fig. 4.)

In the drawings, the half slats 5 are shown connected by means of rivets, but it will be readily understood that these parts may be connected in any suitable manner either by bolts or by being welded. The upper portions of the end posts 2 and the plates 4 of the top rails 3 are provided with vertical slots 7, and formed in the edges of these slots are half round notches 8 which receive the bolts utilized in attaching the pilot to the bumper beam.

The notches formed in the edges of each slot are alternately disposed, i. e., the notches formed in one edge are directly opposite the straight portions of the opposite edge. The slots formed in the post 2 are preferably approximately twice the length of the slots in the plates 4 in order that two or more attaching bolts may be used between the ends of the pilot and the bumper beam. The corresponding notches of the slots in the plates 4 and the upper portions of the slots 7 occupy corresponding horizontal planes in order that the various attaching bolts may be readily seated in a corresponding horizontal row of notches when the pilot is adjusted vertically upon the bumper beam.

The bolts 9 used for attaching the pilot to the bumper beam pass through elongated holes 10 formed in the front wall of said bumper beam and through the slots and notches in the posts 2 and plates 4, and the threaded ends of these bolts receive nuts 11.

The bumper beam 12 which receives the pilot is provided with depending brackets 13 against which the upper portions of the posts 2 engage and these brackets are provided with elongated bolt holes which receive the lowermost bolts of the pairs which pass through the slots in said end posts.

Formed integral with the end posts 2 and the plates 4 to the sides of the slots therein are rearwardly projecting lugs 14 which are adapted to enter corresponding apertures 15 formed in the front face of the bumper beam, such construction being shown in our patent hereinbefore referred to, and being for the purpose of relieving the attaching bolts 9 from strains due to the weight of the attaching pilot. The construction just described permits the pilot to be adjusted vertically upon the bumper beam and when the nuts are tightened upon the bolts, the pilot is rigidly fixed to said bumper beam at the desired height and it is effectually held in true central position.

The notches in the upper portions of the slots, being horizontally alined, insures an accurate and corresponding adjustment of the ends of the pilot, and during such adjustment or when a bolt is shifted from a notch on one side of a slot to a notch on the other side, said bolt is moved from one end of the corresponding elongated bolt hole 10 to the other.

The notches at the sides of the slots are arranged so that for any one vertical position of the pilot the bolt through one vertical member of said pilot, that is, either the end post 8 or plate 4 is at one end of the corresponding slot in the bumper beam, while in the adjacent vertical member of the pilot the bolt is at the opposite end of the corresponding slot in the beam. Such arrangement permits vertical adjustment of the pilot, but prevents horizontal movement thereof so that the pilot is always held in true central position. This arrangement also prevails in the attaching means for the coupler pocket.

In Figs. 2 and 3 we have shown a coupler pocket 16 applied to the central portion of the bumper beam, and the attaching means for said pocket is preferably the same as that utilized between the pilot and the bumper beam, namely, bolts which pass through vertically disposed slots provided in their opposite edges with half round notches. (See Fig. 2.)

The modified attaching means illustrated in Figs. 5 and 6 comprises bolts 17 which pass through vertical slots 18 in the upper portions of the posts 2, and formed integral with and projecting rearwardly from said posts are lugs 19 which are adapted to enter recesses 20 formed in the front face of the bumper beam and the depending brackets 13.

In the modified form of attaching means illustrated in Figs. 9 to 11, inclusive, the attaching bolts 21 are provided with integral D-shaped collars 22, which, when the bolts are properly applied, occupy the vertical slots and certain of their half round notches, which are formed in the end posts 2 and plates 4 of the pilot. In this construction the apertures through the bumper beam and its depending brackets 13 are round instead of oblong.

In Figs. 12 and 13 we have shown a pilot provided at its ends with a series of integral horizontally disposed plates 23, the same serving as steps to permit trainmen to readily pass from the ground to the bumper beam, or vice versa.

By our improved construction it is possible to produce a comparatively long pilot, or one having a base length of three or four feet, as easily as a comparatively short pilot, and by forming the pilot in two or more parts, the foundry work is greatly simplified and cheapened.

It will be readily understood that owing to the irregular shape of a pilot it is a comparatively difficult matter to cast the entire pilot in one piece, and the percentage of loss in producing large one piece and irregular shaped castings is comparatively great.

By virtue of our improved construction the pilot sections which are comparatively small can be readily cast, and when said sections are properly connected, a pilot is produced which is, in effect, practically as strong and rigid as a one piece structure, and in case either section becomes broken, it can be replaced and the unbroken section continued in service.

Our improved attaching means, namely, the bolts passing through the notched slots, permits the pilot to be readily adjusted in vertical position upon the bumper beam, and as the corresponding notches of the various slots are horizontally alined, both sides of the pilot can be correspondingly moved without the necessity of repeated measurements at either end of the pilot.

It will be readily understood that minor changes in the size, form and construction of the various parts of our improved locomotive pilot may be made and substituted for those herein shown and described, without departing from the spirit of our invention, the scope of which is set forth in the appended claims.

We claim:

1. A locomotive pilot comprising two separately formed skeleton members, a flange projecting from the inner edge of one of said members, which flange underlies the corresponding edge of the opposite member, and which members are rigidly fixed to each other.

2. A locomotive pilot comprising a pair of skeleton members each being integrally cast and comprising a base, an end upright, a horizontally disposed top member, a series of inclined slats between the base and top member, and a flange on one of said slats, which flange projects beneath the corresponding slat of the opposite member.

3. A locomotive pilot comprising a pair of members, each cast integral and comprising a base, an end upright, a horizontally disposed top member, a bearing plate which is provided with a vertical slot having notched sides adapted to receive fastening devices and a series of inclined slats between the base and top member.

4. A locomotive pilot comprising a plurality of skeleton sections, each section cast integral and comprising a base member, an end upright provided with a vertically disposed slot having notched sides adapted to receive fastening devices, a horizontally disposed top member, and a series of inclined slats between said base member and the top member.

5. A locomotive pilot comprising a plurality of skeleton sections, each section comprising a base member, an end upright provided with a vertically disposed slot having notched sides adapted to receive fastening devices, a horizontally disposed top member, a series of inclined slats between said base member and the top member, a supporting flange on the side of one member for the opposite member and means whereby said skeleton members are rigidly fixed to each other.

6. The combination with a pilot support, of a locomotive pilot provided in certain parts with vertically disposed slots having laterally disposed notches, and bolts adapted to pass through said slots and notches and engage in said pilot support.

7. The combination with a pilot support, of a locomotive pilot provided in certain parts with vertically disposed slots having laterally disposed notches, the corresponding notches of the various slots being horizontally alined, and bolts adapted to pass through said slots and notches and through said pilot support.

8. The combination with a pilot support, of a locomotive pilot provided with attaching plates in which are formed vertical slots having laterally disposed notches, and which slots and notches are adapted to receive attaching devices which are seated in said pilot support.

9. The combination with a support, of a pilot provided in certain of its parts with vertical slots having laterally disposed notches, attaching means adapted to pass through said slots and engage in the support and interengaging lugs and recesses on said support and pilot.

10. The combination with a locomotive pilot support, of a pilot provided with a series of vertical slots, having laterally disposed notches, attaching means passing through the slots and notches and seated in the pilot support, and means for supporting the weight of the pilot upon the support independently of said attaching means.

11. The combination with a locomotive pilot support, of a pilot provided with vertical slots having laterally disposed notches, and members for attaching the pilot to the support, parts of which attaching members are adapted to occupy the notches in the edges of said slots.

12. The combination with a locomotive pilot support, of a pilot provided with vertical slots having laterally disposed notches, bolts adapted to pass through said slots and notches for securing the pilot to the support, and there being openings formed in the support which receive said bolts and permit the same to be located in the notches on either side of the slots.

13. The combination with a pilot support, of a pilot having a vertically disposed slot provided with laterally disposed notches, a bolt adapted to pass through said slot and engage in the pilot support, and a collar on said bolt for engaging in one of said notches 14. A cast metal pilot for locomotives formed in two main parts, the outer end of each part having integrally formed steps.

15. A cast metal pilot for locomotives formed in two main parts, each having a plurality of steps formed integral with its outer end portion.

16. A locomotive pilot comprising two integral cast half members, and a plurality of brackets integral with the outer end of each of said half members, which brackets constitute steps.

17. A locomotive pilot comprising a plurality of cast sections, each section comprising a base member, an attaching plate, an end upright, a top member, a series of inclined slats between said base member and top member, and horizontally disposed plates integral with the end upright, which plates constitute steps.

18. The combination with a supporting member, of a locomotive pilot provided with vertically disposed slots having laterally disposed notches, there being horizontally disposed slots formed in the supporting member, and bolts passing through the notched slots and the slots in the supporting member for attaching the pilot to said member, the slots in said supporting member having a length approximately one and one-half times the diameter of the attaching bolts.

19. The combination with a supporting member, of a locomotive pilot provided with vertically disposed slots having laterally disposed notches, bolts adapted to pass through said slots and notches for securing the pilot to the support, and there being horizontally disposed slots formed in the support, which last mentioned slots are of such length as to accommodate the bolts when the same are located in the notches on either side of the slots.

In testimony whereof we hereunto affix our signatures in the presence of two witnesses, this 23rd day of February, 1914.

F. J. HARRISON.
WM. J. KNOX.

Witnesses:
W. I. FINCH,
JAS. GRATTON.

Copies of this patent may be obtained for five cents each, by addressing the "Commissioner of Patents, Washington, D. C."